United States Patent
Kaltenbach et al.

(10) Patent No.: US 10,640,120 B2
(45) Date of Patent: May 5, 2020

(54) METHOD FOR SYNCHRONIZING THE LAYSHAFT SPEED IN THE DIRECT GEAR

(71) Applicant: ZF Friedrichshafen AG, Friedrichshafen (DE)

(72) Inventors: Johannes Kaltenbach, Friedrichshafen (DE); Johannes Glückler, Eriskrich (DE); Stefan Renner, Bodman-Ludwigshafen (DE); Rayk Gersten, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 121 days.

(21) Appl. No.: 15/773,000

(22) PCT Filed: Oct. 5, 2016

(86) PCT No.: PCT/EP2016/073763
§ 371 (c)(1),
(2) Date: May 2, 2018

(87) PCT Pub. No.: WO2017/076567
PCT Pub. Date: May 11, 2017

(65) Prior Publication Data
US 2018/0354520 A1    Dec. 13, 2018

(30) Foreign Application Priority Data
Nov. 3, 2015  (EP) ..................................... 15192737

(51) Int. Cl.
*B60W 30/19*     (2012.01)
*B60K 6/365*     (2007.10)
(Continued)

(52) U.S. Cl.
CPC ............. *B60W 30/19* (2013.01); *B60K 6/365* (2013.01); *B60K 6/48* (2013.01); *B60K 6/547* (2013.01);
(Continued)

(58) Field of Classification Search
None
See application file for complete search history.

(56) References Cited

U.S. PATENT DOCUMENTS

| 7,992,458 B2 | 8/2011 | Krieger et al. |
| 8,663,065 B2 | 3/2014 | Kaltenbach |

(Continued)

FOREIGN PATENT DOCUMENTS

| DE | 10 2005 043 703 A1 | 3/2007 |
| DE | 10 2009 046 620 A1 | 5/2011 |

(Continued)

OTHER PUBLICATIONS

German Search Report Corresponding to 10 2015 221 487.7 dated Sep. 22, 2016.

(Continued)

*Primary Examiner* — Justin Holmes
(74) *Attorney, Agent, or Firm* — Davis & Bujold PLLC; Michael J. Bujold

(57) ABSTRACT

A method of synchronizing the countershaft speed, in the direct gear, for a hybrid application. The transmission (1) comprises a main transmission (HG) comprising two parallel partial transmissions with at least one countershaft (VW), an output shaft (3), and two planetary transmissions (PG1, PG2) each comprising a carrier (ST1, ST2), sun gear (SR1, SR2) and ring gear (HR1, HR2). Each partial transmission has a transmission input shaft (4, 5), with a hollow first input shaft (4) and the solid second input shaft (5). The first planetary transmission (PG1) connects as a range group to (Continued)

the main transmission (HG). The main transmission (HG) comprises first (R1), second (R2), third (R3), fourth (R4) and fifth gear planes (R5) and first (S1), second (S2), third (S3) and fourth shift elements (S4). Synchronization of the countershaft speed to a target speed, in direct gear, is performed via speed control of the electric machine (2).

10 Claims, 8 Drawing Sheets

(51) Int. Cl.

| | | |
|---|---|---|
| B60K 6/48 | (2007.10) | |
| B60K 6/547 | (2007.10) | |
| B60W 10/08 | (2006.01) | |
| B60W 20/00 | (2016.01) | |
| F16H 3/12 | (2006.01) | |
| F16H 3/00 | (2006.01) | |
| B60W 10/06 | (2006.01) | |
| F16H 37/04 | (2006.01) | |
| B60W 10/113 | (2012.01) | |
| B60W 10/111 | (2012.01) | |
| B60W 10/115 | (2012.01) | |
| F16H 3/091 | (2006.01) | |
| F16H 3/54 | (2006.01) | |
| F16H 37/06 | (2006.01) | |

(52) U.S. Cl.
CPC ............ *B60W 10/06* (2013.01); *B60W 10/08* (2013.01); *B60W 10/111* (2013.01); *B60W 10/113* (2013.01); *B60W 10/115* (2013.01); *B60W 20/00* (2013.01); *F16H 3/006* (2013.01); *F16H 3/091* (2013.01); *F16H 3/126* (2013.01); *F16H 3/54* (2013.01); *F16H 37/046* (2013.01); *F16H 37/065* (2013.01); B60K 2006/4816 (2013.01); B60K 2006/4825 (2013.01); B60Y 2200/92 (2013.01); F16H 2200/0069 (2013.01); F16H 2200/0095 (2013.01); F16H 2200/2005 (2013.01); F16H 2306/48 (2013.01); Y02T 10/6221 (2013.01); Y02T 10/6252 (2013.01)

(56) References Cited

U.S. PATENT DOCUMENTS

| | | |
|---|---|---|
| 8,684,875 B2 | 4/2014 | Kaltenbach et al. |
| 8,911,315 B2 | 12/2014 | Kaltenbach et al. |
| 8,961,345 B2 | 2/2015 | Kaltenbach et al. |
| 9,180,872 B2 | 11/2015 | Lee et al. |
| 9,403,428 B2 | 8/2016 | Glueckler |
| 9,528,583 B2 | 12/2016 | Lübke et al. |
| 9,541,180 B2 | 1/2017 | Kaltenbach |
| 9,546,721 B2 | 1/2017 | Mittelberger et al. |
| 2008/0113847 A1* | 5/2008 | Groner ................. B60W 10/02 477/34 |
| 2009/0107270 A1* | 4/2009 | Krieger ................... F16H 59/38 74/339 |
| 2009/0239704 A1* | 9/2009 | Steinborn ............ B60W 10/06 477/4 |
| 2012/0216639 A1 | 8/2012 | Renner |
| 2012/0240723 A1 | 9/2012 | Gluckler et al. |
| 2013/0023375 A1* | 1/2013 | Renner ................... F16H 3/006 475/209 |
| 2013/0096761 A1 | 4/2013 | Kuroda et al. |
| 2014/0011624 A1* | 1/2014 | Reisch ................. F16H 37/084 475/214 |
| 2014/0038762 A1 | 2/2014 | Wechs |
| 2014/0150604 A1 | 6/2014 | Kaltenbach |
| 2015/0184731 A1 | 7/2015 | Lee et al. |
| 2015/0226324 A1 | 8/2015 | Gluckler et al. |
| 2015/0267778 A1 | 9/2015 | Peterson et al. |
| 2015/0375736 A1 | 12/2015 | Kaltenbach et al. |

FOREIGN PATENT DOCUMENTS

| | | |
|---|---|---|
| DE | 10 2009 054 752 A1 | 6/2011 |
| DE | 10 2010 030 571 A1 | 12/2011 |
| DE | 10 2010 030 573 A1 | 12/2011 |
| DE | 10 2010 030 575 A1 | 12/2011 |
| DE | 10 2010 063 582 A1 | 6/2012 |
| DE | 10 2011 005 531 A1 | 9/2012 |
| DE | 10 2011 080 069 A1 | 1/2013 |
| DE | 10 2013 105 785 A1 | 12/2013 |
| DE | 10 2012 213 711 A1 | 2/2014 |
| DE | 10 2012 217 503 A1 | 3/2014 |
| DE | 10 2012 218 367 A1 | 4/2014 |
| DE | 10 2012 220 063 A1 | 5/2014 |
| DE | 10 2012 220 829 A1 | 5/2014 |
| DE | 10 2012 221 889 A1 | 6/2014 |
| DE | 10 2013 200 158 A1 | 7/2014 |
| DE | 10 2013 211 969 A1 | 1/2015 |
| DE | 10 2013 222 510 A1 | 5/2015 |
| DE | 10 2014 202 381 A1 | 8/2015 |
| EP | 2 457 760 A2 | 5/2012 |
| WO | 2012/084330 A1 | 6/2012 |
| WO | 2015/142265 A1 | 9/2015 |

OTHER PUBLICATIONS

German Search Report Corresponding to 10 2015 221 490.7 dated Sep. 23, 2016.
German Search Report Corresponding to 10 2015 221 499.0 dated Jul. 15, 2016.
German Search Report Corresponding to 10 2015 221 514.8 dated Sep. 29, 2016.
German Search Report Corresponding to 10 2015 221 493.1 dated Sep. 27, 2016.
International Search Report Corresponding to PCT/EP2016/074680 dated Jan. 26, 2017.
International Search Report Corresponding to PCT/EP2016/073763 dated Dec. 7, 2016.
International Search Report Corresponding to PCT/EP2016/074446 dated Dec. 13, 2016.
International Search Report Corresponding to PCT/EP2016/076417 dated Feb. 17, 2017.
International Search Report Corresponding to PCT/EP2016/074687 dated Jan. 2, 2017.
Written Opinion Corresponding to PCT/EP2016/074680 dated Jan. 26, 2017.
Written Opinion Corresponding to PCT/EP2016/073763 dated Dec. 7, 2016.
Written Opinion Corresponding to PCT/EP2016/074446 dated Dec. 13, 2016.
Written Opinion Corresponding to PCT/EP2016/076417 dated Feb. 17, 2017.
Written Opinion Corresponding to PCT/EP2016/074687 dated Jan. 2, 2017.

\* cited by examiner

Fig. 2

| | PG2 | R1 | R2 | R3 | R4 | R5 | PG1 |
|---|---|---|---|---|---|---|---|
| i | -2 | -1.3 | -0.592 | -1 | -0.769 | -2.197 | -2.713 |

Fig. 3

| | S1 | | S2 | | S3 | | S4 | | S5 | | S6 | | i | phi |
|---|---|---|---|---|---|---|---|---|---|---|---|---|---|---|
| | A | B | C | D | E | F | G | H | L | S | I | J | | |
| G1 | x | | | | | | | | | | | | | |
| G2(1) | x | | | | | | | | | | | | 10.604 | 1.300 |
| G2(4) | | x | | x | | | | | | | | | 8.157 | 1.000 |
| G3(4) | | x | | x | | | | | | | | | 8.157 | 1.300 |
| G4 | | x | | | x | | | | | | | | 6.274 | 1.299 |
| G5(4) | | x | x | | | | | | | | | | 4.829 | 1.300 |
| G5(9) | | x | | | | x | | | | | | | 3.713 | 1.000 |
| G5(6) | | | x | | | x | | | | | | | 3.713 | 1.000 |
| G6 | x | | | | | | | | | | | | 3.713 | 1.300 |
| G7(6) | x | | | | | | | | | | | | 2.856 | 1.300 |
| G7(9) | x | | | x | | | | | | | | | 2.197 | 1.000 |
| G8(9) | x | | | x | | | | | | | | | 2.197 | 1.300 |
| G9 | x | | | | | | | | | | | | 1.689 | 1.299 |
| G10(9) | | | x | | | | | | | | | | 1.301 | 1.301 |
| G10 | | | x | | | | | | | | | | 1.000 | 1.000 |
| G10(6) | x | | | | | | | | | | | | 1.000 | 1.000 |
| G10(0) | x | | | | | | | | | | | | 1.000 | 1.000 |

Fig. 4

| | S1 | | S2 | | S3 | | S4 | | S5 | | S6 | | i | phi |
|---|---|---|---|---|---|---|---|---|---|---|---|---|---|---|
| | A | B | C | D | E | F | G | H | L | S | I | J | | |
| G1 | x | | | | | | | | | | x | | 10.604 | 1.300 |
| G2(1) | x | x | | | | | | | | | x | | 8.157 | 1.000 |
| G2(4) | | x | | x | | | x | | x | | x | | 8.157 | 1.300 |
| G3(4) | | x | x | | x | | x | | x | | x | | 6.274 | 1.299 |
| G4 | | x | | | | | x | | x | | x | | 4.829 | 1.300 |
| G5(4) | | x | | | | | x | | x | | x | | 3.713 | 1.000 |
| G5(9) | | | | | | x | | | x | | x | | 3.713 | 1.000 |
| G5(6) | | | | | | x | | | | | x | | 3.713 | 1.300 |
| G6 | x | | x | | | x | | x | | x | x | | 2.856 | 1.300 |
| G7(6) | x | | | x | | | | x | | x | x | | 2.197 | 1.000 |
| G7(9) | | x | | x | | | | x | | x | x | | 2.197 | 1.300 |
| G8(9) | | x | | | | | | x | | x | x | | 1.689 | 1.299 |
| G9 | | x | x | | x | | | x | | x | x | | 1.301 | 1.301 |
| G10(9) | | x | x | | | x | | x | | x | x | | 1.000 | 1.000 |
| G10 | x | | | | | x | | | | x | x | | 1.000 | 1.000 |
| G10(6) | x | | | | | x | | | | | x | | 1.000 | 1.000 |
| G10(0) | | | | | | x | | | | | x | | 1.000 | 1.000 |

|  | S1 |  | S2 |  | S3 |  | S4 |  | S5 |  | i | phi |
|---|---|---|---|---|---|---|---|---|---|---|---|---|
|  | A | B | C | D | E | F | G | H | L | S |  |  |
| G1 | x |   |   |   |   |   |   |   | x |   | 10.604 | 1.300 |
| G2(1) | x |   |   | x |   |   |   |   | x |   | 8.157 | 1.000 |
| G2(4) |   | x | x | x |   |   |   |   | x |   | 8.157 | 1.300 |
| G3(4) |   | x |   |   | x |   |   |   | x |   | 6.274 | 1.299 |
| G4 |   | x | x |   |   |   |   |   | x |   | 4.829 | 1.300 |
| G5(4) |   | x |   |   |   | x |   |   | x |   | 3.713 | 1.000 |
| G5(9) |   | x |   |   |   | x | x |   | x |   | 3.713 | 1.000 |
| G5(6) |   |   |   |   |   | x | x | x |   |   | 3.713 | 1.300 |
| G6 | x |   | x |   |   |   | x | x |   | x | 2.856 | 1.300 |
| G7(6) | x | x |   |   |   |   | x | x |   | x | 2.197 | 1.000 |
| G7(9) | x | x |   |   |   |   |   | x |   | x | 2.197 | 1.300 |
| G8(9) |   | x | x |   | x |   |   | x |   | x | 1.689 | 1.299 |
| G9 |   | x |   |   |   | x |   | x |   | x | 1.301 | 1.301 |
| G10(9) |   |   | x |   |   | x |   | x |   | x | 1.000 | 1.000 |
| G10 |   |   | x |   |   | x |   |   |   | x | 1.000 | 1.000 |
| G10(6) | x |   |   |   |   | x |   |   |   | x | 1.000 | 1.000 |
| G10(0) | x |   |   |   |   |   |   |   |   | x | 1.000 | 1.000 |

| | S1 | | S2 | | S3 | | S4 | | S5 | | S7 | i | phi |
|---|---|---|---|---|---|---|---|---|---|---|---|---|---|
| | A | B | C | D | E | F | G | H | L | S | R | | |
| G1 | x | | x | | | | x | | x | | | 10.604 | 1.300 |
| G2(1) | x | | | | | | x | | x | | | 8.157 | 1.000 |
| G2(4) | | x | | x | | | x | | x | | | 8.157 | 1.300 |
| G3(4) | | x | | x | x | | x | | x | | | 6.274 | 1.299 |
| G4 | | x | x | | | | x | | x | | | 4.829 | 1.300 |
| G5(4) | | x | x | | | x | | | x | | | 3.713 | 1.000 |
| G5(9) | | x | | | | x | | | x | | | 3.713 | 1.000 |
| G5(6) | x | | | | | | | | x | | | 3.713 | 1.300 |
| G6 | x | | x | | | | | x | | x | | 2.856 | 1.300 |
| G7(6) | x | | | | | | | x | | x | | 2.197 | 1.000 |
| G7(9) | | x | | x | | x | | x | | x | | 2.197 | 1.300 |
| G8(9) | | x | x | | x | x | | x | | x | | 1.689 | 1.299 |
| G9 | | x | x | | | x | | x | | x | | 1.301 | 1.301 |
| G10(9) | | x | x | | | x | | | | x | | 1.000 | 1.000 |
| G10 | x | | | | | | | | | x | | 1.000 | 1.000 |
| G10(6) | x | | | | | | | | | x | | 1.000 | 1.000 |
| G10(0) | x | | | | | | | | | x | | 1.000 | 1.000 |
| G10(R) | | | | x | | x | | | | x | x | 1.000 | 10.604 |
| GR1 | x | | | | | | x | | x | | x | -21.231 | -2.002 |
| GR2 | | x | | | | | x | x | x | x | x | -9.662 | -0.911 |
| GR3 | x | | | | | | | x | | x | x | -5.711 | -0.539 |
| GR4 | | x | | | | | | | | | x | -2.601 | -0.245 |

METHOD FOR SYNCHRONIZING THE LAYSHAFT SPEED IN THE DIRECT GEAR

This application is a National Stage completion of PCT/EP2016/073763 filed Oct. 5, 2016, which claims priority from European patent application serial no. 15192737.3 filed Nov. 3, 2015.

FIELD OF THE INVENTION

The invention relates to a method for synchronizing the countershaft speed in the direct gear for lowering the countershaft speed in a transmission. A transmission referred to here is in particular a multi-speed transmission in which a plurality of gears, thus fixed ratios between two shafts of the transmission, by which shift elements are preferably automatically shifted. The shift elements are, for example, clutches or brakes. Such transmissions are used primarily in motor vehicles, in particular also hi commercial vehicles, to adapt the rotational speed and torque output characteristics of the drive unit to the driving resistances of the vehicle in a suitable manner.

BACKGROUND OF THE INVENTION

Vehicles with hybrid drives are known from the prior art. Hybrid drives have two or more different drive sources, wherein power trains with an internal combustion engine and one or more electric motors have largely prevailed as a parallel hybrid or mixed hybrid. These variants are substantially parallel in the power flow arrangement of the engine and the electric drive and thus both a superposition of the drive torque and a control with purely internal combustion engine drive or purely electric motor drive is possible.

From DE 10 2010 030 573 A1 a hybrid drive with an automated transmission is known which has an internal combustion engine, which is drive-connected to at least one first transmission input shaft, with an electric drive having at least one electric machine, which is drive-connected to a second transmission input shaft, with at least one countershaft, with idler gears and fixed gears arranged in several gear set planes, with multiple gear shifting devices and with a transmission output shaft. In order to allow a great variability in terms of a gear set concept and the distribution and the number of electric and internal combustion engine gears, to keep the design and cost and to ensure efficient and comfortable operation, it is provided that the two transmission input shafts are arranged coaxially to each other, and that a gear shifting device connects the two transmission input shafts in an effective manner into one of their display positions, and shifts one gear into another shifting position. Thus, a partial transmission coupling is possible, which couples the two input shafts, the hollow shaft and the solid shaft, without a gear being shifted.

In order to achieve the most effective possible operation of the hybrid drive, transmission strategies are used, which flexibly use the electric drive depending on the situation, for example, for starting, as a starter generator or as a generator for power generation. From DE 10 2010 063 582 A1 a device for a power train of a hybrid vehicle is known, with a planetary transmission having the elements planetary carrier, sun gear and ring gear, wherein a first element of these elements of the planetary transmission of the fixed connection of a first transmission input shaft serves a first partial transmission of a transmission, and wherein a second element of these elements of the planetary transmission of the fixed connection serves an electric machine of a hybrid drive, with a first shift element, via which a third element of these elements of the planetary transmission in a first shifting position of the first shift element serves a second transmission input shaft of a second partial transmission of the transmission, to which further an internal combustion engine of the hybrid drive can be coupled, and can be connected in a second shifting position of the first shift element on the housing side or stator side, and with a second shift element, via which both transmission input shafts of both partial transmissions can be coupled to one another when the second shift element is engaged and when the second shift element is disengaged both transmission input shafts of both partial transmissions can be separated from one another. Thus, an electrodynamic starting and electrodynamic shifting is possible. In addition, the electric machine can be used as an integrated starter generator.

From the document DE 10 2014 202 381 A1 a method for operating a transmission device comprising a first input shaft with at least one shift element and a second input shaft with at least one shift element, wherein the at least one first and/or second shift element without participation in a drive power flow to minimize is/are closed by differential speeds in the transmission device.

The shift elements must be designed as synchronizers.

SUMMARY OF THE INVENTION

The invention addresses the problem of providing an improved method for operating a hybrid transmission device, wherein in particular, efficiency while driving in direct gear should be improved. Especially with long-distance trucks, lowering in direct gear makes sense, since direct gear has a high proportion of driving. It should be omitted on synchronized shift elements.

The object is solved by the features of the independent claims(s). Advantageous embodiments will become apparent from the subsidiary claims, from the description and from the figures.

A corresponding transmission for this method has a main transmission comprising two parallel connected partial transmissions with at least one countershaft, and an output shaft and two planetary transmissions having at least the elements planetary carrier, sun gear and ring gear, Each partial transmission in this case has a transmission input shaft, wherein a first transmission input shaft for a first partial transmission is designed as a hollow shaft and a second transmission input shaft for a second partial transmission is designed as a solid shaft. A first planetary transmission connects as a range group to the main transmission. The range group serves to double the number of gears of the main transmission, wherein two ranges can be shifted, one fast and one slow range. For this purpose, the transmission comprises a fifth shift element, which is either coupled to the ring gear of the range group with an output shaft or fixed to the housing. In the first shifting position, in which the ring gear is connected to the housing, a slow ratio is formed, and in a second shifting position, in which the ring gear is coupled to the output shaft and thus is locked to the planetary gear, a fast gear ratio is produced. The main transmission includes first, second, third, fourth and fifth gear planes and first, second, third and fourth shift elements. A second planetary transmission is provided, as a planetary stage, between an electric machine and the first transmission input shaft.

The fifth gear plane forms the drive constant of the main transmission and can be coupled by means of the fourth shift element in one of its shifting positions to the planetary carrier of the range group. Through the countershaft, the electric machine can thus support the tractive force, in which the torque is transmitted directly from the countershaft onto the drive constant to the planetary carrier of the range group and is thus transferred to the connected output shaft with the planetary carrier of the range group, while the fifth shift element is unloaded and can be shifted. This range change preferably takes place when changing from fifth gear to sixth gear, wherein first of all the shift element for coupling the drive constant to the planetary carrier of the range group is changed and then the shift element for connecting a gear plane of the first partial transmission to the first transmission input shaft is changed.

The fourth shift element connects, in a first shifting position, the fifth gear plane of the main transmission, the drive constant, to the main shaft. Thus, the countershaft is connected via the drive constant of the main transmission to the main shaft and the sun of the planetary transmission of the range group.

The transmission may comprise a sixth double-acting shift element, which couples the second input shaft to the ring gear of the planetary stage into a first shifting position and locks the ring gear of the planetary stage fixed to the housing into a second shifting position. When the ring gear is coupled to the planetary stage, the planetary stage can act as a superposition gear. A drive of the second input shaft is connected to the ring gear of the planetary stage, the electric machine to the sun of the planetary gear stage and the planetary carrier of the planetary gear stage to the first input shaft of the main transmission. In the second shifting position of the sixth shift element, the planetary stage acts as a fixed pretransmission for the electric machine. As a result, the electric machine can be cost-effectively designed with less torque, but higher speed.

The ring gear of the planetary stage can also be connected directly to the transmission housing, or a part of the housing, This also creates a fixed pretransmission of the electric machine with the advantages mentioned above.

In addition, an arrangement is possible in which the planetary stage of the transmission is connected so that the ring gear of the planetary stage is connected to the first transmission input shaft, the planetary carrier of the planetary stage is fixed to the housing and the sun gear of the planetary stage is connected to the electric machine. The transmission in this case comprises a sixth single-acting shift element which, when actuated, connects the second transmission input shaft to the electric machine and the sun gear of the planetary stage. Thus, the electric drive in the forward gears turns backwards and the second transmission input shaft for driving are provided via the planetary stage mechanical reverse gears by means of the sixth shift element. Those gears, which are assigned to the first partial transmission or the first transmission input shaft, are then used as reverse gears with an additional reduction by the planetary stage.

The main transmission includes at least one countershaft, However, it can also be designed as a power split two-countershaft transmission. All gears on the countershaft are designed as fixed gears. In the embodiment with two countershafts, both countershafts are each carried out with a fixed gear per gear plane of the main transmission.

The main transmission is designed as a 5-speed gear set, with five-gear planes, with two partial transmissions and a partial transmission coupling. The fifth gear plane forms the drive constant. All gear planes are designed as forward gear planes and a reverse gear is generated by reversing the direction of rotation of the electric Machine.

The first partial transmission is assigned to the first transmission input shaft, which is designed as a hollow shaft. The second partial transmission is assigned to the second transmission input shaft, which is designed as a solid shaft. The second partial transmission is also assigned a direct gear, in which the power flow is not performed on the countershaft or countershafts. The two partial transmissions can be coupled by one of the shift elements, so that the gears of the partial transmissions can be sometimes used by the respective other partial transmission. As a result, a coupling of the two drives is possible without causing torque to be conducted to the output shaft. In addition, due to the two partial transmissions, the two drives can be operated with different ratios. Thus, suitable operating points can be selected for both drives depending on the driving situation. The electric machine can also be partially or completely brought to a standstill to avoid zero load losses, All shift elements in the main transmission are designed as unsynchronized claw shift elements.

All shift elements of the main transmission and the first planetary transmission, the range group, are designed as double-acting shift elements, which means that they have two operating directions in a first and in a second shifting position. But they could also be brought into a third disengaged shifting position, a neutral position in which neither the first nor the second shifting position is actuated, and no components are connected by the shift element.

The coupling of components of the transmission with the housing can also be implemented by the coupling with a housing-fixed component or a housing component or with another rotationally fixed component of the transmission.

In order to achieve better efficiency, the speed of the countershaft should be lowered when driving in a direct gear, thereby reducing drag losses, for example, on the bearings and the seals. The reduction of the countershaft speed in direct gear allows a better overall efficiency of the transmission in direct gear. Less speed means less drag performance (power dissipation) on bearings and seals. The countershaft speed can also be lowered to zero. This results in no drag losses on the bearings and seals of the countershaft. This is done according to the invention by the synchronization of the countershaft to the target speed via a speed control on the electric machine. For this purpose, the shift element of the highest gear of the first partial transmission is advantageously engaged before, unless it was engaged previously. Thus, the electric machine itself also does not reach a high-speed level and can, therefore, synchronize quickly. To lower the countershaft speed different shift elements from the ballast or a partial transmission can be engaged. This does not burden conventional synchronizers.

The transmission may be part of a power train of a hybrid vehicle, In addition to the transmission, the power train has an internal combustion engine as the second transmission and an axle gear connected to gears of the hybrid vehicle, wherein the second transmission input shaft of the main transmission is constantly connected or connectable to the internal combustion engine and the output shaft of the transmission is drivingly connected to the axle gear. A clutch for the internal combustion engine can be used, but is not necessary for purely electric driving, since the second transmission input shaft can be decoupled by opening shift elements.

BRIEF DESCRIPTION OF THE DRAWINGS

Hereinafter, the present invention will be further explained with reference to exemplary embodiments:

FIG. 2: Table with exemplary gear ratios of the transmission of FIG. 1,

FIG. 3: Shifting matrix for the method according to the invention,

FIG. 4: Shifting matrix for the method according to the invention,

FIG. 6: Shifting matrix for the method according to the invention to embodiment variant 2, FIG. 8: Shifting matrix for the method according to the invention to embodiment variant 3.

DETAILED DESCRIPTION OF THE PREFERRED EMBODIMENTS

Figure 1:
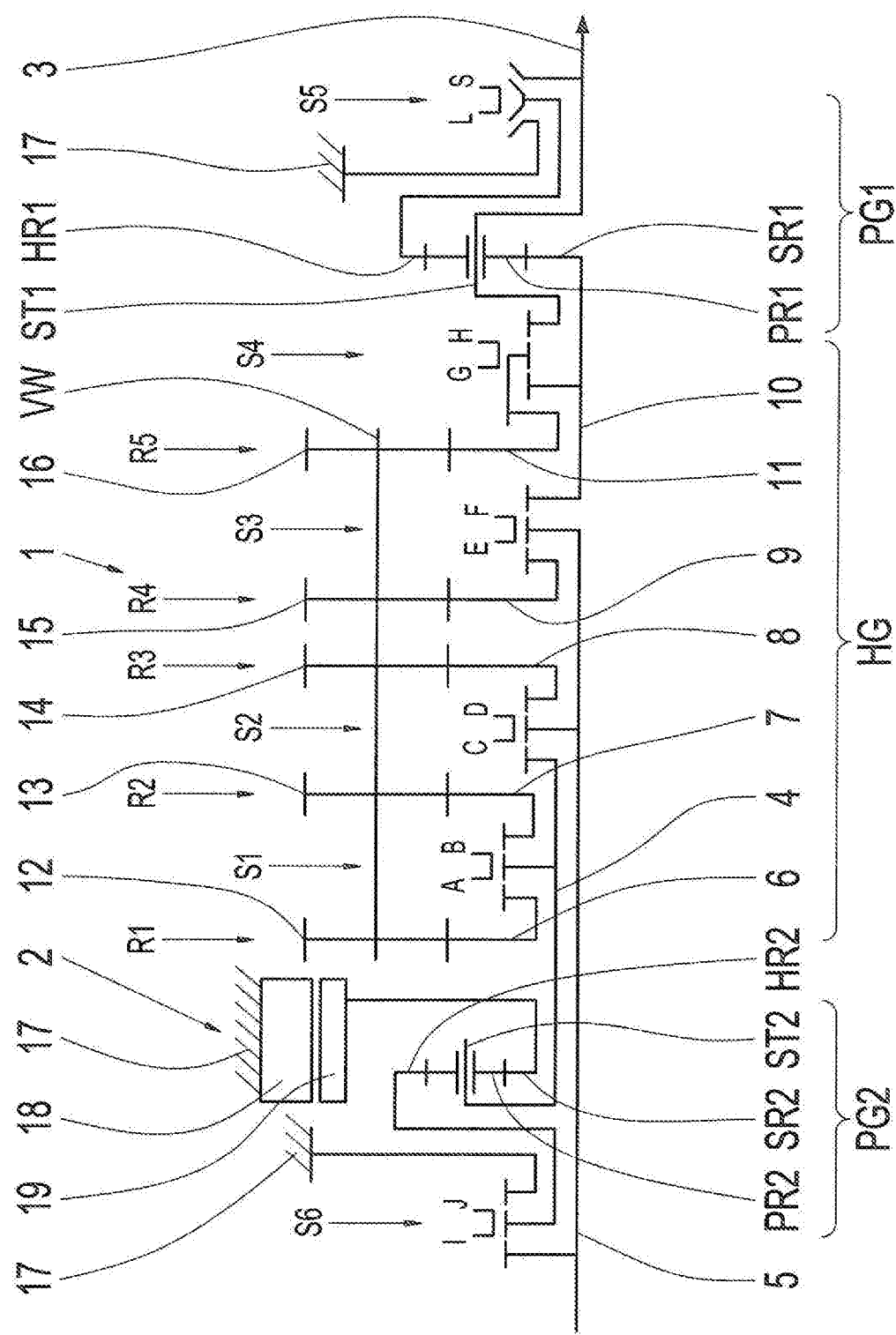
FIG. 1: 10-speed transmission for the method according to the invention.

FIG. 1 shows a first embodiment of a transmission 1 with an electric machine 2, with a 5-speed main transmission HG with two partial transmissions, with an output shaft 3, a first planetary transmission PG1 and a second planetary transmission PG2, each having the planetary elements carrier ST1, ST2, at least one planetary transmission PR1, PR2, sun gear SR1 SR2 and a ring gear HR1, HR2. The first planetary transmission PG1 is used as a range group and connects to the main group HG. The second planetary transmission PG2 is arranged as a planetary stage between the electric machine 2 and the first transmission input shaft 4. The first transmission input shaft 4 is designed as a hollow shaft and assigned to a first partial transmission of the main transmission HG. A second transmission input shaft 5 is designed as a solid shaft and assigned to the second partial transmission of the main transmission HG. The main transmission HG comprises a first gear plane R1, a second gear plane R2, a third gear plane R3, a fourth gear plane R4 and a fifth gear plane R5 and a first shift element S1, a second shift element S2, a third shift element S3 and a fourth shift element S4. The fifth gear plane R5 forms the drive constant of the main transmission HG. All shift elements S1-S4 of the main transmission are designed as double-acting two-sided shift elements and can connect two different elements of the transmission 1 with a shaft or a transmission component. The first gear plane R1 is formed by a first idler gear 6 of the first transmission input shaft 4 with a first fixed gear 12 of the countershaft VW. The second gear plane R2 is formed by an idler gear 7 of the first transmission input shaft 4 with a second fixed gear 13 of the countershaft VW. The third gear plane R3 is formed by a third idler gear 8 on the second transmission input shaft 5 and a third fixed gear 14 of the countershaft VW. The fourth gear plane R4 is formed by a fourth idler gear 9 on the second transmission input shaft 5 and a fourth fixed gear 15 on the countershaft VW. The fifth gear plane R5 is formed by a fifth idler gear 11 on the main shaft 10 and a fifth fixed gear 16 on the countershaft VW. The main shaft 10 extends coaxially with the transmission input shaft 4, 5 and the output shaft 3 and is located between the second transmission input shaft 5 and the output shaft 3. The countershaft VW extends parallel to the axis of the transmission input shafts 4, 5, the main shaft 10 and the output shaft 3. In this case, the first shift element S1 connects, in a first shifting position A, the first gear plane or the second gear plane R2, in a second shifting position B, to the first transmission input shaft 4. The second shift element 32 can connect the first transmission input shaft 4, in a first shifting position C, or the third gear plane R3, in a second shifting position D, to the second transmission input shaft 5. The second shift element S2 in the first shifting position C thus serves the partial transmission coupling. The third shift element S3 can, in a first shifting position E, couple the fourth gear plane R4 or can, in a second shifting position F, couple the main shaft 10 to the second transmission input shaft 5. In the second shifting position F, a direct gear can thus be shifted, wherein torque is transmitted from the second transmission input shaft 5, via the main shaft 10 and the first planetary transmission PG1, to the output shaft 3. In a first shifting position G, the fourth shift element S4 can connect the main shaft 10 or, in a second shifting position H, can connect the planetary carrier ST1 of the first planetary gear PG1 to the fifth gear plane R5. The drive constant, the fifth gear plane R5 of the main transmission HG, can thus be coupled via a single shift element, the fourth shift element S4, either to the sun SR1 or to the planetary carrier ST1 of the first planetary transmission PG1, since the main shaft 10 is connected directly to the sun gear SR1 of the first planetary transmission. By the coupling of the electric machine 2 thus made possible via the drive constant to the planetary carrier ST1 of the first planetary transmission PG1, the fifth shift element S5 is load-free and can be shifted. The electric machine 2 thus supports the tractive force via the countershaft VW, so that the range group PG1 can be shifted with traction support, Another advantage of the coupling of the electric machine 2 to the planetary carrier ST1 is that the speed of the countershaft VW can be lowered, during driving in direct gear, to reduce drag losses on bearings and seals.

Each of the shift elements S1-S4 can also be shifted to neutral so that it does not connect any of the mentioned elements.

The transmission 1 comprises a range group in the form of a first planetary transmission PG1. The range group PG1 serves to double the number of speeds of the main transmission HG. For a fifth shift element S5, which is assigned to the range group PG1, in a first shifting position L, the ring gear HR1 of the first planetary transmission PG1 is connected to a housing-fixed component 17 or a housing component or to another non-rotatable component of the transmission 1. This creates a slow range. In a second shifting position S of the fifth shift element S5, the ring gear HR1 of the first planetary transmission PG1 can be connected to the output shaft 3 and thus also to the planetary carder ST1 of the first planetary transmission PG1. The planetary carrier ST1 is rotationally fixed to the output shaft 3. Thus, in the second shifting position S of the shift element S5, the components planetary carrier ST1 and the ring gear HR1 are locked together and form a fast range.

The second planetary transmission PG2 is arranged as a planetary stage between the electric machine 2 and the first transmission input shaft 4. The electric machine 2 has a stator 18 which is non-rotationally fixed to a housing-fixed component 17 or a transmission housing of the transmission 1 or with another non-rotatable component of the transmission 1, so that the stator 18 cannot attain any speed. A rotationally mounted rotor 19 of the electric machine 2 is rotationally fixed to a sun gear SR2 of the second planetary transmission PG2 formed as a planetary gear set shaft of the planetary stage PG2. The planetary carrier ST2 of the second planetary transmission PG2 is rotationally fixed to the first transmission input shaft 4. The ring gear HR2 of the second planetary transmission PG2 is connected via a sixth shift element SS, in a first shifting position I, which is assigned to the second planetary transmission PG2 to the second transmission input shaft 5 and fixed to the housing, in a second shifting position J of the sixth shift element SS. In the first shifting position I of the sixth shift element S6, the planetary stage PG2 can act as a superposition gear. In the second shifting position J of the sixth shift element S6, the planetary stage PG2 acts as a fixed pretransmission for the electric machine 2. As a result, the electric machine 2 can be designed cost-effectively with less torque, but a higher speed.

By arranging the electric machine 2 with the planetary stage PG2 on the first transmission input shaft 4, the electric machine 2 is assigned to the first partial transmission. The second transmission input shaft 5 is also driven by a second transmission, not shown here. Since this is usually an internal combustion engine 21, the internal combustion engine 21 will be referred to as a second transmission in the further document. The internal combustion engine 21 is thus connected or connectable to the second partial transmission. Each partial transmission is also assigned shiftable gears via the assigned gear planes R1-R5. The first gear plane R1 and the second gear plane R2 of the main transmission HG are assigned to the first transmission input shaft 4 and thus also to the first partial transmission of the main transmission HG. Thus, a purely electric driving via the two gears is possible, which area provided via the two-gear planes R1 and R2. The area group PG1 produces four shiftable purely electric gears. Driving in reverse is possible by reversing the direction of rotation of the electric machine 2. A disconnect clutch for the internal combustion engine 21 is not necessary for purely electric driving, since the second transmission input shaft 5 can be disconnected by disengaging the second and third shift elements S2, S3. The third gear plane R3 and the fourth gear plane R4 of the main transmission HG are assigned to the second transmission input shaft 5 and thus also to the second partial transmission of the main transmission HG. The fifth gear plane R5 serves as the drive constant for both partial transmissions of the main transmission HG. Due to the partial transmission coupling via the second shift element 32 in the first shifting position C, the internal combustion engine 21 and the electric machine 2 can still use the gears of the respective other partial transmission. Even though the second shift element S2 is designed as a double shift element, double-acting two-sided shift element, the electric machine 2 cannot use the third gear plane R3 of the main transmission HG.

By means of the two partial transmissions, the internal combustion engine 21 and electric machine 2 can be operated with different ratios. Thus, suitable operating points can be selected for the internal combustion engine 21 and for the electric machine 2 depending on the driving situation. The electric machine 2 can also be partially decoupled and brought to a standstill, thus avoiding zero load losses. A decoupling of the electric machine 2 is possible via the first and the second shift element S1 and S2, which should not connect the first transmission input shaft 4 to another component, and the sixth shift element S6, which should not couple the ring gear HR2 of the planetary stage to the second transmission input shaft 5.

By the partial transmission coupling via the second shift element 32 in the shifting position C, the internal combustion engine 21 can be connected to the electric machine 2, without a torque being conducted to the output shaft 3. Thus at least the first shift elements S1 and the third shift element S3 of the main transmission HG are not actuated, but in a neutral position. As a result, the internal combustion engine 21 can be started with the electric machine 2 or it can be generated in neutral, that is to say independently of the driving speed, that is to say also when the machine is at a standstill. In this case, the internal combustion engine 21 drives the electric machine 2. The electric machine 2 operates as a generator.

FIG. 1 shows only the upper half of the axis of the transmission input shafts 4, 5, the main shaft 10 and the output shaft 3 symmetrical gear set of the transmission 1. Mirroring on this axis leads to a variant with two countershafts VW, which serve for power sharing. But the gear set is functionally identical in the embodiment with only one countershaft VW.

This means that the countershaft VW including the associated fixed gears 12, 13, 14, 15, 16 are not mirrored.

With the embodiment of FIG. 1, a starting function known under the acronym EDA, electrodynamic starting, can be implemented. The electric machine 2 can be used purely or only to support the internal combustion engine 21 for starting and accelerating. In the case of a purely electric start-up, an increased starting torque can be provided via the second planetary transmission PG2 acting as constant transmission. In order to be able to start electrodynamically, the sixth shift element S6 must be in its first shifting position I. When the sixth shift element SS is in the first shifting position I, the transmission 1 is in EDA mode. Furthermore, a gear of the first partial transmission, which is assigned to the first transmission input shaft 4, must be engaged and the second partial transmission must be in neutral, without transmission of torque. The first gear G1 of the transmission 1 is assigned to the first gear plane R1 in FIG. 1. The first gear plane R1 is assigned to the first partial transmission. Thus, for electrodynamic starting, the first shift element S1 can be used, in its first shifting position A, and in the further power flow, the fourth shift element S4 can be in its first shifting position G and the fifth shift element S5 can be in its first shifting position L for the first gear G1. Thus, in the first gear G1 a power flow is prepared in the slow range from the first transmission input shaft 4 via the first gear plane R1, the countershaft VW, the drive constant R5, the main shaft 10 and the range group PG1. When the vehicle is stationary, the internal combustion engine 21 rotates, for example, with the idle speed and the electric machine 2 rotates backwards, so that the planetary carrier ST2 of the planetary stage PG2 is stationary. The torque ratios at the planetary stage PG2 are constant. The torque of the internal combustion engine 21 and the torque of the electric machine 2 are added to the planetary carrier ST2 of the planetary stage PG2. During the electrodynamic starting, the rotational speed of the electric machine 2 changes until the direct coupling at the planetary stage PG2. The starting can be stopped by bringing the second shift element S2 into its first shifting position C, and thus blocking the planetary stage PG2.

If the transmission 1 is operated in EDA mode, Electrodynamic Shifting (EDS) is possible as a load shifting function. In this case, in the EDA mode, the sixth shift element S6 remains in its first shifting position I. A gear assigned to the first partial transmission and thus to the first transmission input shaft 4 must be engaged. This serves as a support gear, via which the power flow is conducted during the load circuit. The support gear can be identical to the current gear or a target gear. However, it is also possible to use another gear of the first partial transmission. The shifting process begins with a load transfer phase. In this case, the torques are set on the internal combustion engine 21 and on the electric machine 2 so that they correspond to the stationary gear ratio of the planetary gear stage PG2. As a result, there is only one more power flow via the planetary carrier ST2 of the planetary gear stage PG2 and the support gear. All other shift elements become load-free. The load-free shift elements of the actual gear are disengaged. The rotational speeds of the engine 21 and the electric machine 2 are regulated such that the shift element of the target gear to be engaged becomes synchronous. If a synchronicity is established, the shift element of the target gear is engaged. Thus, the shifting operation is completed and the load on the electric machine 2 can be reduced, if necessary. The EDS shifting method has the advantage that the shift element of the target gear is synchronized by the interaction of the electric machine 2 and the internal combustion engine 21, wherein the electric machine 2 can be very easily adjusted. Another advantage of the EDS shifting method is that a high tractive force can be achieved because the torques of the internal combustion engine 21 and the electric machine 2 are added to the second planetary transmission PG2.

With the embodiment of FIG. 1, a function known under the acronym ISG, Integrated Starter Generator, can also be implemented, in which the internal combustion engine 21 can be started and accelerated, via the electric machine 2, and the electric machine 2 can also be used as a generator. In the ISG mode, the sixth shift element S6 is in its second shifting position J and connects the ring gear HR2 with a component 17 fixed to the housing. Even a purely electric driving is possible in the ISG mode, wherein the ring gear HR2 of the planetary gear stage PG2 is fixed to the housing and the electric machine 2 transmits torque to the planetary carrier ST2 of the planetary gear stage PG2.

FIG. 2 shows exemplary numerical values for the individual transmissions i f the respective gear planes PG1, PG2, R1-R5. The specified ratio corresponds to the respective teeth ratio of the spur gears or planetary transmissions of the standard ratio i0, the teeth ratio between the ring gear HR1, HR2 and the sun gear SR1, SR2. The negative sign refers to a reversal of the direction of rotation. The ratio i of the spur gear pairs is given in the following direction of power flow:

First, second, third and fourth gear planes R1 R2, R3, R4: from both transmission input shafts 4, 5 to the countershaft VW Fifth gear plane R5: from the countershaft VW to the main shaft 10

Other numerical values can also be used for the transmission series.

FIG. 3 shows an associated shifting matrix of the transmission 1 for the ten gears G1-G10 from the point of view of the internal combustion engine 21 in the ISG mode. The sixth shift element S6 remains in its second shifting position J. The gears G1-G10 are listed in the first column. If the internal combustion engine 21 performs a power flow via the second partial transmission, via the solid shaft 5, then a gear can be preselected in the power-flow-free first partial transmission, via the hollow shaft 4, or the partial transmissions can be coupled. The preselection is indicated after the passage number in parenthesis. For example, in the gear G2 (1), the second gear G2 is active for the internal combustion engine 21, the first gear G1 is preselected for the internal combustion engine 21 and, at the same time, is already active for the electric machine 2. In this case, for the gears G1-G10 the following columns indicate which shift elements S1-S6 are in which shifting positions A-J. A cross x marks an engaged shifting position A-J. Subsequent to the columns of the shift elements S1-S6, there is a column with exemplary gear ratios i and a column with exemplary gear jumps phi to each gear G1-G10.

The power flow in the first gear G1, as shown in FIG. 3, is conducted to the output shaft 3 via the second transmission input shaft 5, the second shift element S2, in its first shifting position C, the first shift element S1, in its first shifting position A, the first gear plane R1, the countershaft VW, the drive constant R5, the fourth shift element 34 in its first shifting position G, the range group PG1 shifted in the slow range. The power flow in the second gear G2 is conducted to the output shaft 3 via the second transmission input shaft 5, the second shift element S2, in its second shifting position D, the third gear plane R3, the countershaft VW, the drive constant R5, the fourth shift element S4 in its first shifting position G, the range group PG1 shifted in the slow range shifted. In this case, both the first gear G1, and thus the first gear plane R1 can be preselected via the first shift element S1 in its first shifting position A, and also the fourth gear G4 and thus the second gear plane R2 can be preselected, via the second shifting position B. The preselected gears G1, G4 are assigned to the first partial transmission. The power flow in the third gear G3 is conducted to the output shaft 3 via the second transmission input shaft 5, the third shift element S3, in its first shifting position E, the fourth gear plane R4, the countershaft VW, the drive constant R5, the fourth shift element S4, in its first shifting position G, and the range group PG1 shifted in the slow range. In this case, the fourth gear G4 and thus the second gear plane R2 can be preselected, via the first shift element S1 in its second shifting position B. The power flow in the fourth gear G4 is conducted to the output shaft 3 via the second transmission input shaft 5, the second shift element S2, in its first shifting position C, the first transmission input shaft 4, the first shift element S1, in its second shifting position B, the second gear plane R2, the countershaft VW, the drive constant R5, the fourth shift element S4, in its first shifting position G, which is the range group PG1 shifted in the slow range.

The power flow in the fifth gear G5 is conducted to the output shaft 3 via the second transmission input shaft 5, the third shift element S3, in its second shifting position F, the range group PG1 shifted in the slow range. In this case, the fourth gear G4 can be preselected via the first shift element S1, in its second shifting position B, and via the fourth shift element S4, in its first shifting position G. Alternatively, the ninth gear G9 can be preselected via the first shift element S1, in its second shifting position B, and via the fourth shift element S4, in its second shifting position H. Likewise, the sixth gear G6 can be preselected via the first shift element S1, in its first shifting position A, and via the fourth shift element S4, in its second shifting position H. The power flow in the sixth gear G6 is conducted to the output shaft 3 via the second transmission input shaft 5, the second shift element S2, in its first shifting position C, the first transmission input shaft 4, the first shift element S1, in its first shifting position A, the first gear plane R1, the countershaft VW, the drive constant R5, the fourth shift element S4, in its second shifting position H, and via the range group PG1 shifted in the fast range. In this case, the fifth shift element S5 according to the invention is load-free, since it is bypassed by the power transmission via the planetary carrier STI of the area group PG1 by the fourth shift element S4 in its second shifting position H.

The power flow in the seventh gear G7 is conducted to the output shaft 4 via the second transmission input shaft 5, the second shift element S2, in its second shifting position D, the third gear plane R3, the countershaft VW, the drive constant R5, the fourth shift element S4, in its second shifting position H, and conducted via the range group PG1 shifted in the fast range, wherein the fifth shift element S5 is still load-free. In this case, the sixth gear G6 can be preselected via the first shift element S1, in its first shifting position A, or the ninth gear G9 can be preselected via the first shift element S1, in its second shifting position B. The power flow in the eighth gear G8 is conducted to the output shaft 3 via the second transmission input shaft 5, the third shift element S3, in its first shifting position E, the fourth gear plane R4, the countershaft VW, the drive constant R5, the fourth shift element S4, in its second shifting position H, and via range group PG1 shifted in the fast range, wherein the fifth alternative shift element S5 is still load-free. In this case, the ninth gear G9 can be preselected via the first shift element S1, in its second shifting position B. The power flow in ninth gear G9 is conducted to the output shaft 3 via the second transmission input shaft 5, the second shift element S2, in its first shifting position C, the first transmission input shaft 4, the first shift element Si, in its second shifting position B, the second gear plane R2, the countershaft VW, the drive constant R5, the fourth shift element S4, in its second shifting position H, and via range group PG1 shifted in the fast range, wherein the fifth shift element S5 is still load-free. The power flow in the tenth gear G10 is conducted to the output shaft 3 via the second transmission input shaft 5, the third shift element S3, in its second shifting position F, the main shaft 10 and via the range group PG1 shifted in the fast range. In addition, it is advantageous if the second shift element S2 is shifted, in its first shifting position C, so that the first transmission input shaft 4 is conducted at a defined speed, here the speed of the second transmission input shaft 5. Alternatively, the ninth gear G9 can be preselected via the first shift element S1, in its second shifting position B, and the fourth shift element S4, in its second shifting position H, with the fifth shift element S5 being load-free. However, it is also possible to preselect the sixth gear G6 via the first shift element S1, in its first shifting position A, and the second shift element S2, in its first shifting position C. Then a reduction of the countershaft speed is possible, however, the fourth shift element S4 must be disengaged. Via the preselection of the first shift element S1, in its first shifting position A, a standstill of the electric machine 2 and the countershaft VW is also possible, wherein the second shift element S2 must be disengaged.

In the sixth, seventh, eighth and ninth gears G6-G9, the fifth shift element S5 could remain engaged, even in the first shifting position L instead of in the second shifting position 5, since the fifth shift element S5 in both shifting positions L and S is load-free when the power flow via the fourth shift element S4, in the second shifting position H, is conducted directly to the planetary carrier ST1 of the first planetary transmission PG1, Due to the speed ratios at the range group PG1, it is however advantageous to perform the change from the first shifting position L of the fifth shift element 35 to the second shifting position S as early as possible.

The power interruption-free shifting of the area group PG1 usually takes place when changing from the fifth gear G5 to the sixth gear G6. In fifth gear G5 in the ICG or hybrid driving in the ISG mode, this is connected via a direct gear in the slow range group PG1. The third shift element S3 is in its second shifting position F and the fifth shift element is in its first shifting position L. This can also be seen in FIG. 3 in the line G5 (4). Due to its previous history, the electric machine 2 is still acting in the fourth gear G4, wherein the first shift element S1 is in its second shifting position B and the fourth shift element 34 in its first shifting position G. In order to switch into the sixth gear G6 without traction interruption, the following procedural steps are carried out:

If load is present on the electric machine 2, a load reduction takes place here. Thus, the internal combustion engine 21 carries the load.

Subsequently, the fourth shift element S4 can be disengaged from the shifting position G.

The second shifting position H of the fourth shift element 34 is actively synchronized via the speed control of the electric machine 2. For this purpose, the speed of the electric machine 2 must be lowered. The speed reduction is performed by the factor of the transmission of the range group PG1 which, in the numerical example of FIG. 3, corresponds to a factor 3.713.

Subsequently, the fourth shift element S4 can be shifted load-free in the second shifting position H. This corresponds to the line of the passage 5 (9) in the shifting matrix FIG. 3. Transitionally, the ninth gear G9 is preselected in this state, since the first shift element S1 is still in its second shifting position B. This can now be disengaged load-free. The first shifting position A of the first shift element S1 is now synchronized actively via speed control of the electric machine 2, For this purpose, the speed of the electric machine 2 must be raised to the target speed level of the sixth gear G6, The speed increase takes place by the ratio of the gear ratio of the two gears, which are assigned to the first transmission input shaft. These are here the first and the fourth gears G1, G4, which means a speed increase by the factor 1.3/0.592=2.2 (see FIG. 2, first and second gear planes R1, R2), Thus, the first shift element Si can be brought load-free into the shifting position A wherein, at the same time, the connection, the sixth gear G6, is preselected.

Subsequently, a load transition from the internal combustion engine 21 to the electric machine 2 takes place. This means that it is only the electric machine 2 that supports the tractive force in the target gear, the sixth gear G6.

After the internal combustion engine 21 is load-free, the second shifting position F of the third shift element S3 is disengaged.

Optionally, now a change of the fifth shift element S5 from the first shifting position L takes place in the second shifting position S while the shifting position F of the third shift element S3 is disengaged. This offers the advantage that only the main shaft 10 and thus a small inertial mass acts on the sun gear SR1 of the first planetary transmission PG1. The synchronization takes place via the shift element S5 itself, which is executed synchronized. The second shifting position S of the fifth shift element S5 can then be engaged. The second shifting position S cannot be actively synchronized with the engine 21, because the engine 21 cannot lower the speed far enough, since here the speed level of the tenth gear G10 (the third shift element S3 and the fifth shift element S5, respectively, in the second shifting position F and S) would be needed, although sixth gear G6 is the target gear. The change from the first shifting position L to the second shifting position S of the fifth shift element S5 at this point, as already mentioned, is advantageous but not essential. The change could also take place outside the circuit from the fifth gear G5 to the sixth gear G6 at a later time. The fifth shift element S5 would then initially remain in the first shifting position L.

Immediately after the shifting position F of the third shift element S3 has been disgaged, which may mean at the same time as the step just mentioned, the internal combustion engine 21 synchronizes to the target rotational speed of the sixth gear G6. Thus, the first shifting position C, of the second shift element, is synchronized and can then be engaged load-free. Thus, the sixth gear G6 is engaged and the shifting operation for the shift elements S1-S6 is completed. The load transition from the electric machine 2 to the internal combustion engine 21 can then take place depending on the operating strategy.

In summary, in order to get from the fifth gear G5 to the sixth gear G6, both the fourth shift element S4 and the first shift element S1 must be shifted. In this case, first the fourth shift element S4 is changed and then only the first shift element S1. As a result, the electric machine 2 is first lowered in speed and can synchronize with high torque. Less energy is needed to change the rotational speed of the inertial mass of the rotor 19. If initially the first shift element S1 is shifted, the rotational speed of the electric machine 2 would rise sharply and, in the meantime, there would be the risk of overspeeding; a low torque of the electric machine 2 at high speed.

The method is independent of the pretransmission of the planetary stage PG2 for the electric machine 2. It is also possible without a planetary stage PG2, wherein the electric machine 2 or the rotor 19 would be connected directly to the first transmission input shaft 4.

As already described, in the direct gear, in the tenth gear G10 (see FIG. 3) in the ISG mode, the rotational speed of the countershaft VW or the countershafts can be lowered. For the ISG mode, the sixth shift element S6 is also engaged in the second shifting position J. It is driven by internal combustion engine, wherein the third shift element S3 is in its second shifting position F. The fourth shift element S4 is due to its prehistory in its second shifting position H. As a result, the numerical example in FIG. 2, the rotational speed of the countershaft VW is higher by a factor of 2.197 than that of the internal combustion engine 21. This corresponds to the spur gear ratio i of the fifth gear plane R5. The sun gear SR1 and the planetary carrier ST1 of the range group PG1 have identical rotational speeds because the range group PG1 is locked by the fifth shift element, in its second shifting position S. The reduction of the speed of the countershaft VW allows a better overall efficiency of the transmission 1 in the direct gear G10. Less speed means less drag losses or power losses on the bearings and seals. For this purpose, load-free shift elements can be engaged, In the present gear set, it is advantageous to bring the first shift element S1 into its first shifting position A, The speed of the countershaft VW is then only (1/1.3=0.769) 0.769 times the internal combustion engine 21. The speed of the countershaft VW can also be lowered to zero. Thus drag losses would be avoided at the storage. The synchronization of the countershaft VW to the target speed is performed via a speed control on the electric machine 2. For this purpose, first the shift element of the highest gear of the first partial transmission is engaged, unless it is engaged from its previous history. In the example illustrated here, this is the first shift element in the second shifting position B; through which the fourth gear G4 is provided via the second gear plane R2, Thus, the electric machine 2 itself does not reach a high-speed level and, therefore, can synchronize faster. No conventional synchronizations are loaded either. In the shifting matrix in FIG. 3, at the tenth gear with preselected sixth gear G10 (FIG. 6), the speed of countershaft VW is lowered and in tenth gear with preselected idle G10 (0) the speed of countershaft VW and the rotational speed of electric machine 2 are lowered to zero. Again, the speed change of the countershaft VW is performed using the electric machine 2.

FIG. 4 shows an associated shifting matrix of the transmission 1 for the ten gears G1-G10 from the point of view of the internal combustion engine 21 in the ISG mode. The sixth shift element S6 remains in its first shifting position I. Otherwise, the shifting matrix in the EDA mode is identical to the shifting matrix in the ISG mode of FIG. 3. However, there are other speed ratios at the electric machine 2 and at the planetary stage PG2.

The power interruption-free shifting of the range group PG1, when changing from the fifth gear G5 to the sixth gear G6, can also be performed in EDA mode. In this case, the sixth shift element S6 is always in its first shifting position I. In fifth gear G5 while driving in the EDA mode in driving the internal combustion engine or hybrid driving, this is connected via a direct gear in the slow range group PG1. The third shift element S3 is in its second shifting position F and the fifth shift element is in its first shifting position L. This can also be seen in FIG. 4 in the line G5 (4). Due to its previous history, the electric machine 2 is still acting in the fourth gear G4, wherein the first shift element S1 is in its second shifting position B and the fourth shift element S4 in its first shifting position G. In order to switch into the sixth gear G6 without traction interruption, the following procedural steps are carried out:

If load is present on the electric machine 2, a load reduction takes place here. Thus, the internal combustion engine 21 carries the load.

Subsequently, the fourth shift element S4 can be disengaged from the shifting position G, The second shifting position H of the fourth shift element 34 is actively synchronized via the speed control of the electric machine 2. For this purpose, the speed of the planetary carrier ST2 of the planetary stage PG2 must be lowered, which is done by lowering the speed of the electric machine 2. The speed reduction at the planetary carrier ST2 of the planetary stage PG2 is performed by the factor of the transmission of the range group PG1, which corresponds to the factor of 3.713 in the numerical example of FIG. 4.

Subsequently, the fourth shift element S4 can be shifted load-free in the second shifting position H. This corresponds to the line of the passage 5 (9) in the shifting matrix FIG. 4. Transitionally, the ninth gear G9 is preselected in this state, since the first shift element S1 is still in its second shifting position B. This can now be disengaged load-free. The first shifting position A, of the first shift element S1, is now actively synchronized via speed control of the electric machine 2. For this purpose, the speed of the planetary carrier ST2 of the planetary stage PG2 must be raised by means of the electric machine 2 to the target speed level of the sixth gear 06. The speed increase takes place by the ratio of the gear ratio of the two gears, which are assigned to the first transmission input shaft. These are here the first and the fourth gears G1, G4, which means a speed increase by the factor 1.3/0.592=2.2 (see FIG. 2, first and second gear planes R1, R2).

Thus, the first shift element S1 can be brought load-free into the shifting position A wherein, at the same time, the connection, the sixth gear G6, is preselected.

Then, the torques of the engine 21 and the electric machine 2 are set to be in the ratio of the stationary gear ratio of the planetary stage PG2, so that the third shift element S3 to be configured becomes load-free. The power flow then runs exclusively via the planetary carrier ST2 of the planetary stage PG2 via the target gear, the sixth gear G6, via the first shift element S1, in the first shifting position A, and the fourth shift element, in the second shifting position H. At the same time, the torques of the engine 21 and the electric machine 2 are set within the limits of the two machines so that the traction comes as close as possible to the value desired by the driver or a driving strategy function.

After the third shift element S3 is free of load, the second shifting position F of the third shift element S3 is disengaged.

Optionally, now a change of the fifth shift element S5 from the first shifting position L takes place in the second shifting position S while the shifting position F of the third shift element S3 is disengaged. This offers the advantage that only the main shaft 10 and thus a small inertial mass on the sun gear SR1 of the first planetary transmission PG1 acts. The synchronization takes place via the shift element S5 itself, which is executed synchronized, The second shifting position S of the fifth shift element S5 can then be engaged. The change from the first shifting position L to the second shifting position S of the fifth shift element S5 at this point, as already mentioned, is advantageous but not essential. The change could also take place outside the circuit from the fifth gear G5 to the sixth gear G6 at a later time. The fifth shift element S5 would then initially remain in the first shifting position L.

Immediately after the shifting position F of the third shift element S3 has been disengaged, which may mean at the same time as the step just mentioned, the torques of the internal combustion engine 21 and the electric machine 2 are regulated so that the rotational speed of the internal combustion engine 21 decreases to the target rotational speed. Thus, the first shifting position C, of the second shift element S2 is synchronized and can then be closed load-free, Thus, the sixth gear GS is engaged and the shifting operation for the shift elements S1-S6 is completed. The load transition from the electric machine 2 to the internal combustion engine 21 can then take place depending on the operating strategy.

In summary, in order to go from the fifth gear G5 to the sixth gear G6 in the EDA mode, both the fourth shift element S4 and the first shift element S1 Must be shifted. In this case, first the fourth shift element S4 is changed and then only the first shift element S1. As a result, the electric machine 2 is first lowered in speed and can synchronize with high torque. Less energy is needed to change the rotational speed of the inertial mass of the rotor 19. If initially the first shift element S1 is shifted, the rotational speed of the electric machine 2 would rise sharply and, in the meantime, there would be the risk of overspeeding; a low torque of the electric machine 2 at high speed.

For the first and the fourth shift elements S1 and S4, a load-free speed synchronization, in each case, is performed by means of the electric machine 2.

In this case, a dynamic moment is supported on the ring gear HR2 of the planetary stage PG2 due to inertial masses, which could possibly have a negative effect on driving comfort, because the ring gear HR2 of the planetary stage PG2 is connected to the second transmission input shaft 5 via the sixth shift element S6, in the first shifting position I. Therefore, it would also be possible to toggle from the EDA mode to the ISG mode before the speed synchronization and to be synchronized accordingly. After the respective speed synchronization, a change is made back to the EDA mode.

Other gear assignments are conceivable in the main transmission HG. For example, the second gear plane R2 and the fourth gear plane R4 can be reversed. Thus, the gear planes for the third gear G3 and the fourth gear G4 would be reversed.

In addition, a separating clutch or starting clutch for the internal combustion engine 21 may be added.

In addition, one or more mechanical reverse gears can be added. This can be implemented either as an additional spur gear plane with an additional shift element or planetary reversing gear set with two additional shift dements, one for forward and one for backward. In addition, a so-called GPR range group can be used, in which the reverse gear is integrated in the range group.

Figure 5:
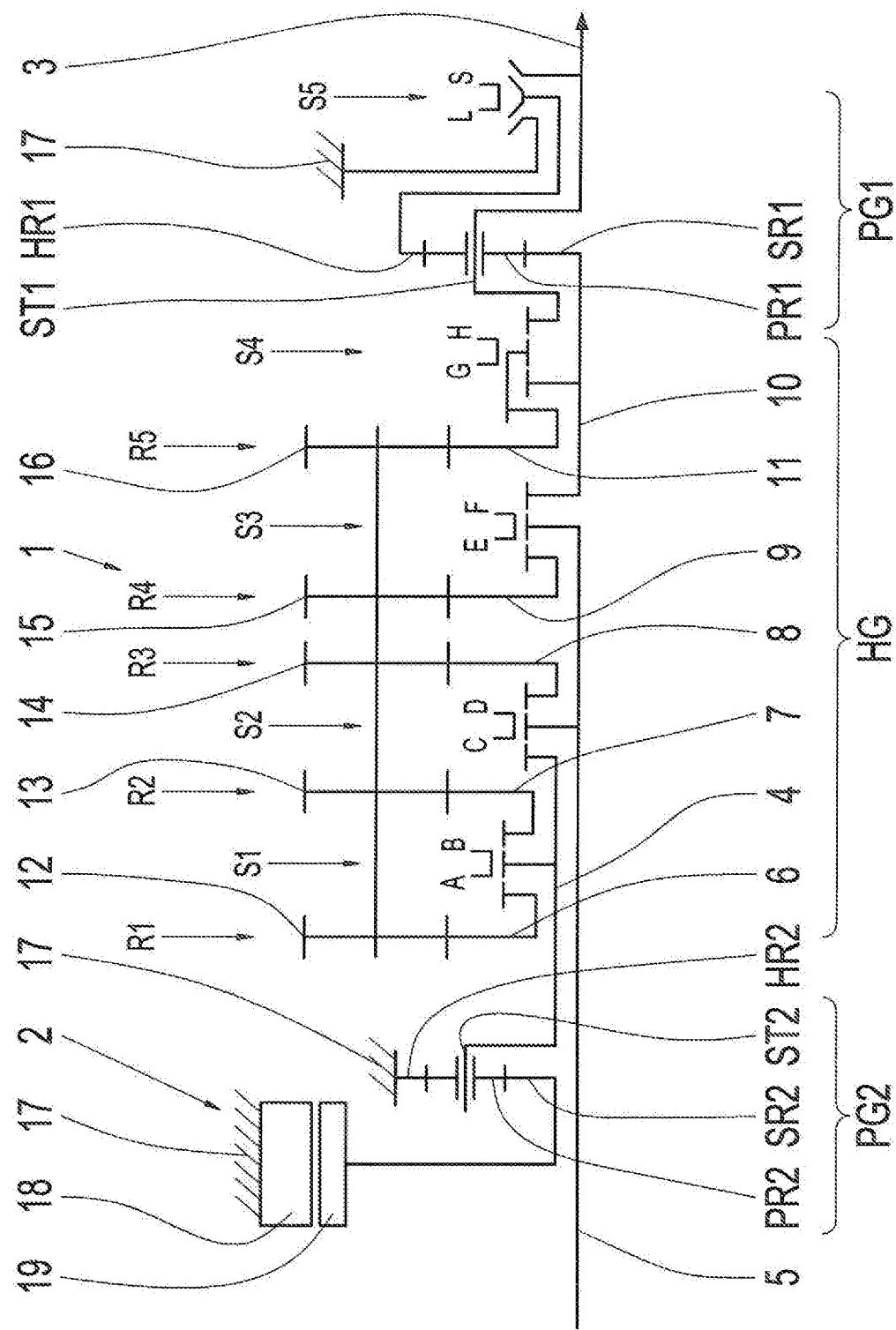
FIG. 5: Variant 2 of a 10-speed transmission for the method according to the invention.

FIG. 5 shows a second embodiment of a 10-speed transmission. The transmission 1 differs only in the embodiment of the second planetary transmission PG2. The second planetary transmission PG2 is also arranged as a planetary stage between an electric machine 2 and the first transmission input shaft 4. The electric machine 2 has a stator 18 which is non-rotationally fixed to a housing-fixed component 17 or a transmission housing of the transmission 1 or to another non-rotatable component of the transmission 1, so that the stator 18 cannot attain any speed. A pivoted rotor 19 of the electric machine 2 is rotationally fixed to a planetary gear set shaft of the planetary stage PG2 configured as a sun gear SR2 of the second planetary transmission PG2. The planetary carrier ST2 of the second planetary transmission PG2 is rotationally fixed to the first transmission input shaft 4. The ring gear HR2 of the second planetary transmission PG2 is rotationally fixed to a housing component 17. A fixed pretransmission for the electric machine 2 has the advantage that the electric machine 2 can be designed cost-effectively with less torque, but higher speed. Due to the arrangement of the electric machine 2 with the planetary stage on the first transmission input shaft 4, the electric machine 2 is further assigned to the first partial transmission. The further structure of the transmission 1 corresponds to the first embodiment of FIG. 1.

The pretransmission by means of planetary stage PG2 could also be completely eliminated. The electric machine 2 is then designed with less speed and more torque. Other gear assignments are conceivable in the main transmission HG. For example, the second gear plane R2 and the fourth gear plane R4 can be reversed. Thus, the gear planes for the third gear G3 and the fourth gear G4 would be reversed.

In addition, a separating clutch or starting clutch for the internal combustion engine 21 may be added. Then, the second and the third shift element S2, S3 can be designed as synchronized shift elements and the synchronization of the gears of the second partial transmission, the gears, which are assigned to the second transmission input shaft 5, takes place with a disengaged clutch.

In addition, here also one or more mechanical reverse gears can be added. This can be implemented either as an additional spur gear plane with an additional shift element or planetary reversing gear set with two additional shift elements, one for forward and one for backward. In addition, a so-called GPR range group can be used, in which the reverse gear is integrated in the range group.

The numerical values for the individual transmissions i of the respective gear planes PG1, PG2, R1-R5, which are shown by way of example in FIG. 2, can also be used for this embodiment variant. Likewise, however, other numerical values can also be used here.

Hg. 6 shows an associated shifting matrix of the transmission 1 from FIG. 5 for the ten gears G1-G10 from the point of view of the internal combustion engine 21. This shifting matrix substantially corresponds to the shifting matrix from FIG. 3 in the ISG mode, with the sixth shift element 86 being omitted since the ring gear HR2 of the planetary stage PG2 is permanently connected, in a rotationally fixed manner, to a housing component. The shifting of the range group PG1 without interrupting tractive forces and the method for lowering the countershaft speed in the direct gear, the tenth gear G10, are also performed as in the first variant in FIG. 1.

Figure 7:
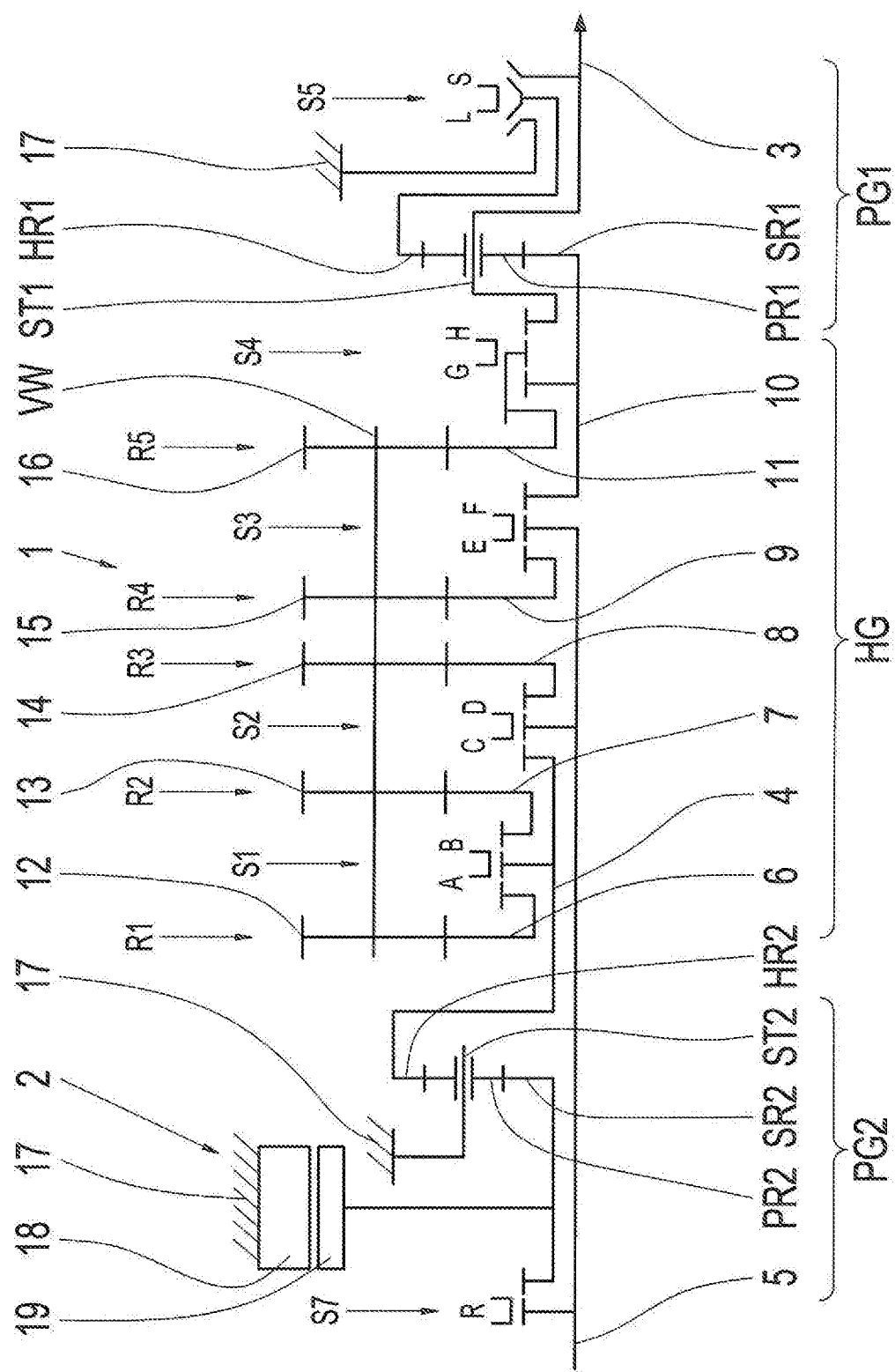
FIG. 7: Variant 3 of a 10-speed transmission for the method according to the invention.

FIG. 7 shows a third embodiment of a 10-speed transmission. The transmission 1 differs from the two previously shown embodiments only in the embodiment of the second planetary transmission PG2. The second planetary transmission PG2 is also arranged as a planetary stage between an electric machine 2 and the first transmission input shaft 4. The electric machine 2 has a stator 18 which is non-rotationally fixed to a housing-fixed component 17 or a transmission housing of the transmission 1 or with another non-rotatable component of the transmission 1, so that the stator 18 cannot assume any speed. A rotationally mounted rotor 19 of the electric machine 2 is rotationally fixed to a sun gear SR2 of the second planetary transmission PG2 formed planetary gear set shaft of the planetary stage PG2. The ring gear HR2 of the second planetary transmission PG2 is rotationally fixed to the first transmission input shaft 4. The planetary carrier ST2 of the second planetary transmission PG2 is rotationally fixed to a housing component 17. In addition, the second planetary transmission PG2 is assigned a seventh shift element 87, which can connect the electric machine 2 and the sun gear SR2 of the second planetary transmission PG2 planetary gear set shaft of the planetary stage with the second transmission input shaft 5. This seventh shift element 87 acts only on one side and, in the engaged shifting position R, can connect the second transmission input shaft 5 and the sun gear SR2 of the second planetary transmission, or it can be open and make no connection between two components. A fixed pretransmission for the electric machine 2 has the advantage that the electric machine 2 can be designed cost-effectively with less torque, but higher speed. In the present case, the electric machine 2 rotates backwards in the forward gears, which is easily possible with an electric machine 2. Via the planetary stage PG2, mechanical reverse gears for the internal combustion engine 21 are made available in its shifting position R with the aid of the seventh shift element S7. The gears that are assigned to the first partial transmission, the gears of the first transmission input shaft 4 with the first and second gear planes R1 and R2, are then used as reverse gears with additional reduction by the planetary stage PG2. Due to the arrangement of the electric machine 2 with the planetary stage on the first transmission input shaft 4, the electric machine 2 is further assigned to the first partial transmission. The further structure of the transmission 1 corresponds to the first embodiment of FIG. 1.

The numerical values for the individual transmissions i of the respective gear planes PG1, PG2, R1-R5, which are shown by way of example in FIG. 2, can also be used for this embodiment variant. Likewise, however, other numerical values can also be used here.

FIG. 8 shows an associated shifting matrix of the transmission 1 from FIG. 7 for the ten gears G1-G10 and four reverse gears GR1-GR4 from the point of view of the internal combustion engine 21. This shifting matrix essentially corresponds to the shifting matrix from FIG. 3, wherein the sixth shift element S6 is omitted and in return a seventh shift element S7 with a shifting position R has been included. The traction-free shifting of the range group PG1 and the method for synchronizing the countershaft speed in the direct gear, the tenth gear G10, are also performed as in the first variant in FIG. 1.

The power flow in the first reverse gear RG1 is, as shown in FIG. 8, is conducted to the output shaft 3 via the second transmission input shaft 5, the seventh shift element S7 in its shifting position R, the second planetary transmission PG2, the first transmission input shaft 4, the first shift element S1, in its first shifting position A, the first gear plane R1, the countershaft VW, the drive constant R5, the fourth shift element S4, in its first shifting position G, the main shaft 10 and the range group PG1 shifted in the slow range. The power flow in the second reverse gear RG2 is conducted to the output shaft 3 via the second transmission input shaft 5, the seventh shift element S7, in its shifting position R, the second planetary transmission PG2, the first transmission input shaft 4, the first shift element Si, in its second shifting position B, the second gear plane R2, the countershaft VW, the drive constant R5, the fourth shift element S4, in its first shifting position G, the main shaft 10 and the range group PG1 shifted in the slow range. The power flow in the third reverse gear RG3 is conducted to the output shaft 3 via the second transmission input shaft 5, the seventh shift element S7, in its shifting position R, the second planetary transmission PG2, the first transmission input shaft 4, the first shift element S1, in its first shifting position A, the second gear plane R2, the countershaft VW, the drive constant R5, the fourth shift element S4, in its second shifting position H, and the range group PG1 shifted in the fast range. The power flow in the fourth reverse gear RG4 is conducted to the output shaft 3 via the second transmission input shaft 5, the seventh shift element S7, in its shift position R, the second planetary transmission PG2, the first transmission input shaft 4, the first shift element S1, in its second shift position B, the first gear plane R1, the countershaft VW, the output constant R5, the fourth shift element S4, in its second shifting position H, and range group PG1 shifted in the fast range.

To lower the rotational speed of the electric machine 2, especially in the direct gear, the following procedure is carried out:

The starting point is a gear of the second partial transmission, which is assigned to the second transmission input shaft 5, during internal combustion engine driving.

This may, for example, be the direct gear, the tenth gear G10, in which the third shift element S3 is in its second shifting position F.

The speed of the electric machine 2 is lowered, wherein the first shift element S1 is disengaged and the seventh shift element S7 is brought into its shifting position R. The seventh shift element S7, or the gear shifted thereby, is synchronized by the speed control of the electric machine 2. The electric machine 2 then rotates at the same speed as the internal combustion engine 21 and the pretransmission of the planetary stage PG2 is not effective. This offers the advantage that low zero load losses occur on the electric machine 2. The electric machine 2 is connected directly to the engine 21 so that at a load point increase on the engine 21, the additional torque of the engine 21 is not directed towards the electric machine 2 via a gearing. This offers a good mechanical efficiency. In the shifting matrix in FIG. 8, this is shown in line G10 (R). In addition, in this example, the countershaft speed is lowered by engaging the second shift element S2, in the second shifting position D (third gear plane R3 with spur gear ratio −1). In the numerical example, the internal combustion engine 21, the electric machine 2 and the countershaft VW all rotate at the same speed. With long-distance trucks, the lowering in direct gear makes particular sense because the direct gear has a high proportion of driving.

Figure 9:
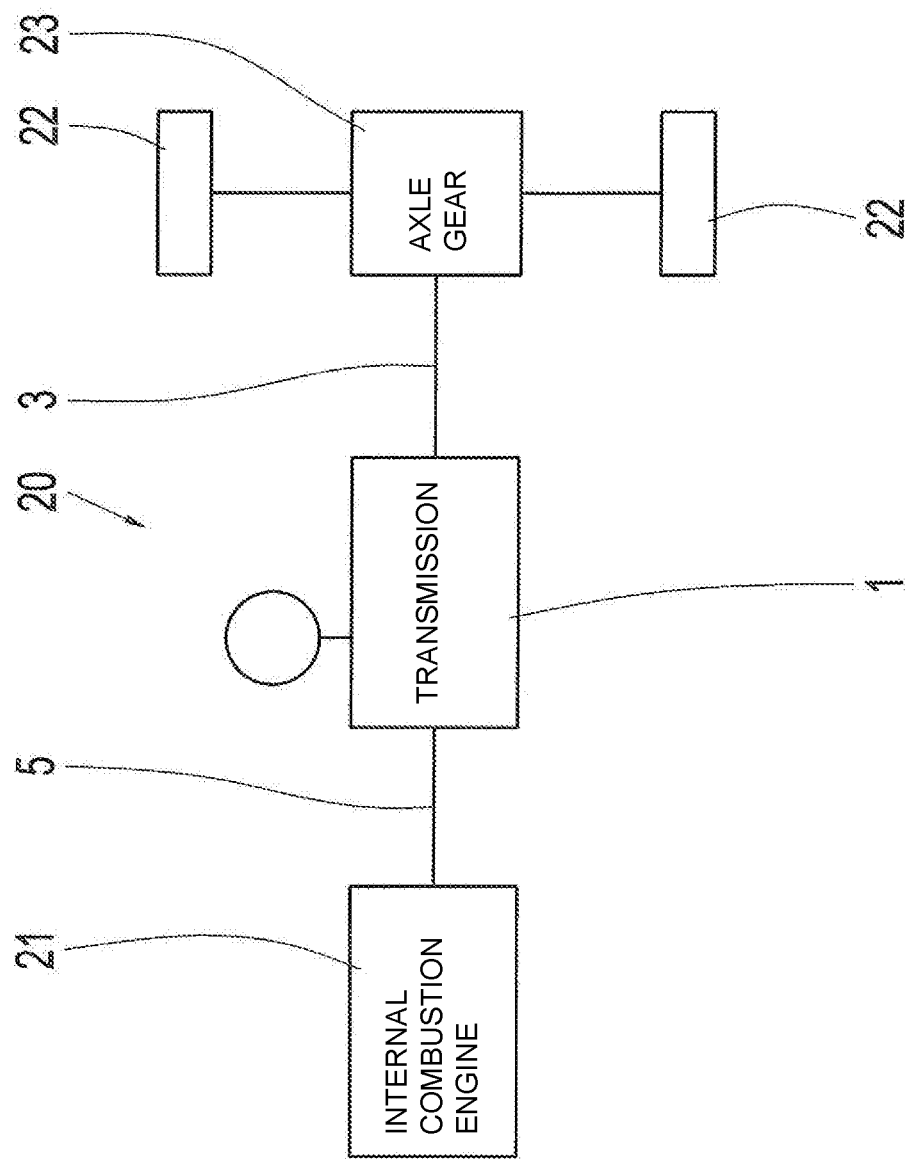
FIG. 9: Power train.

The transmission 1 may be part of a power train 20 of a hybrid vehicle. This is shown in FIG. 9. The power train 20 has, in addition to the transmission 1, an internal combustion engine 21 as a second transmission, and one with gears 22 of the hybrid vehicle connected axle gear 23, wherein the second transmission input shaft 5 of the main transmission HG is continuously connected to the engine 21 or connectable and the output shaft 3 of the transmission 1 is drivingly connected to the axle gear 23. A clutch for the internal combustion engine 21 can be installed between the engine 21 and the transmission 1, but is not necessary for purely electric driving, since the second transmission input shaft 5 can, as described, be decoupled by opening shift elements,

REFERENCE NUMERAL 1 transmission
2 electric machine
3 output shaft
4 first transmission input shaft
5 second transmission input shaft
6 first idler gear of the main transmission
7 second idler gear of the main transmission
8 third idler gear of the main transmission
9 fourth idler gear of the main transmission
10 main shaft
11 fifth idler gear of the main transmission
12 first fixed gear of the countershaft
13 second fixed gear of the countershaft
14 third fixed gear of the countershaft
15 fourth fixed gear of the countershaft
16 fifth fixed gear of the countershaft
17 housing-fixed component
18 stator of the electric machine
19 rotor of the electric machine
20 power train
21 internal combustion engine
22 gears
23 axle gear
HG main transmission
PG1 first planetary transmission, range group
PG2 second planetary transmission, planetary stage
EM electric machine
HR1, HR2 ring gear
ST1, ST2 planetary carrier
SR1, SR2 sun gear
PR1, PR2 planetary gear
51 first shift element
52 second shift element
53 third shift element
54 fourth shift element
55 fifth shift element
56 sixth shift element
57 seventh shift element
A first shifting position of the first shift element S1
B second shifting position of the first shift element S1
C first shifting position of the second shift element S2, partial transmission coupling
D second shifting position of the second shift element S2
E first shifting position of the third shift element S3
F second shifting position of the third shift element 83, direct gear
G first shifting position of the fourth shift element S4 H second shifting position of the fourth shift element S4, traction support of the range group
I first shifting position of the fifth shift element S5, EDA mode
J second shifting position of the fifth shift element 35, ISG mode
L first shifting position of the sixth shift element 36, slow range
S second shifting position of the sixth shift element 36, fast range
R1 first gear plane
R2 second gear plane
R3 third gear plane
R4 fourth gear plane
R5 fifth gear plane, drive constant
G1 first gear
G2 second gear
G3 third gear
G4 fourth gear
G5 fifth gear
G6 sixth gear
G7 seventh gear
G8 eighth gear
G9 ninth gear G10 tenth gear GRI first reverse gear
GR2 second reverse gear GR3 third reverse gear
GR4 fourth reverse gear
i gear ratio
phi gear shifting

The invention claimed is:

1. A method of synchronizing a countershaft speed in a direct gear for lowering the countershaft speed in a transmission for a hybrid application, which has a hybrid drive with an internal combustion engine and an electric machine, wherein the transmission comprises a main transmission comprising two parallel partial transmissions with at least one countershaft, an output shaft, and first and second planetary transmissions, each of the first and second planetary transmissions, comprises of a planetary carrier, a sun gear and a ring gear, each partial transmission has a respective transmission input shaft, a first transmission input shaft is designed as a hollow shaft and a second transmission input shaft is designed as a solid shaft, the first planetary transmission connects, as a range group, to the main transmission (HG), the main transmission comprises first, second, third, fourth and fifth gear planes and first, second, third and fourth shift elements, the method comprising:
performing, via a speed control of the electric machine, synchronization of the countershaft speed to a target speed in the direct gear.

2. The method of synchronizing the countershaft speed in the direct gear according to claim 1, further comprising using a tenth gear as the direct gear.

3. The method of synchronizing the countershaft speed in the direct gear according to claim 1, further comprising lowering the countershaft speed to zero.

4. The method of synchronizing the countershaft speed in the direct gear according to claim 1, wherein the first partial transmission has a plurality of gears ranging from a lowest gear to a highest gear and the method further comprising first engaging a shift element of the highest gear of the first partial transmission, unless the shift element is already engaged.

5. The method of synchronizing the countershaft speed in the direct gear according to claim 4, further comprising using the first shift element, in its second shifting position, as the shift element of the highest gear of the first partial transmission through which a fourth gear is obtained via the second gear plane.

6. The method of synchronizing the countershaft speed in the direct gear according to claim 1, further comprising shifting the third shift element to its second shifting position to obtain the direct gear.

7. The method of synchronizing the countershaft speed in the direct gear according to claim 1, further comprising, for a tenth gear with a preselected sixth gear, lowering the speed of the countershaft, and for the tenth gear with a preselected idling, and lowering the speed of the countershaft and the speed of the electric machine to zero.

8. The method of synchronizing the countershaft speed in the direct gear according to claim 1, further comprising using a shift element of a front-mounted group for synchronization, which is also engaged for a reverse drive.

9. The method of synchronizing the countershaft speed in the direct gear according to claim 8, further comprising using a single-acting seventh shift element, as the shift element of the front-mounted group, which is brought into its engaged shifting position and the first shift element is disengaged.

10. The method of synchronizing the countershaft speed in the direct gear according to claim 1, wherein there are two countershafts (VW) and the method further comprising lowering the countershaft speeds of the two countershafts (VW).

\* \* \* \* \*